United States Patent [19]
Thompson

[11] 3,942,367
[45] Mar. 9, 1976

[54] TRANSPORT TORQUE AND TENSION MEASUREMENT DEVICE

[75] Inventor: Arden Ronald Thompson, River Falls, Wis.

[73] Assignee: Minnesota Mining and Manufacturing Company, St. Paul, Minn.

[22] Filed: Jan. 30, 1975

[21] Appl. No.: 545,411

[52] U.S. Cl. .................... 73/134; 73/143; 242/200
[51] Int. Cl.² ..................... G01L 3/18; G01L 5/12
[58] Field of Search .......................... 242/197–200, 242/210, 57; 73/1 C, 134, 143, 136 R, 136 B, 137

[56] References Cited
UNITED STATES PATENTS
3,771,358  11/1973  Yamano................................. 73/134

FOREIGN PATENTS OR APPLICATIONS
1,919,371  12/1970  Germany ............................. 73/143

Primary Examiner—Leonard D. Christian
Attorney, Agent, or Firm—Alexander, Sell, Steldt & DeLaHunt

[57] ABSTRACT

A device for measuring transport torques and tensions of magnetic video tape record/reproduce units includes a cartridge with a housing that is preferably similar to that of a normal video tape cartridge. Two reels are rotatably disposed in the housing and are provided with torque and tension measuring components in order that measurement of the torque and tensions of a record/reproduce unit may be readily performed upon loading the cartridge in the unit.

3 Claims, 2 Drawing Figures

TRANSPORT TORQUE AND TENSION MEASUREMENT DEVICE

BACKGROUND OF THE INVENTION

1. Field of the Invention

The present invention relates to a device for measuring the transport torques and tensions of magnetic video tape record/reproduce units.

2. Description of the Prior Art

Prior to the present invention, there was no convenient means for measuring the transport torques and tensions of magnetic video tape record/reproduce units. Yet it is often desirable to make such measurements to determine if a video tape unit is operating properly to provide quality recording or reproducing without damaging the tape transported thereby. It is particularly important to make such measurements on video tape units because of the potential loss of not only expensive video tape but also of valuable programs that may be recorded thereon. Heretofore, such measurements were made on video tape units by placing tape reels from a typical video cassette cartridge on the reel drive shafts of a tape unit and then measuring the torques and tensions of the unit by attaching a spring scale to the end of the tape on the reels. Although such prior measurement method produced relatively accurate results, it required skill and experience beyond the average user's ability and was, therefore, usually performed only by trained service personnel. The present invention, in contrast to the above procedure, provides a measuring device that is highly convenient to employ and may be utilized by users having little or no instruction in making transport torque and tension measurements.

A device for measuring transport torques of magnetic tape audio cassette record/reproduce units has been employed in the past and includes a housing that is identical to that of a standard cassette. A single reel is disposed in the housing and is attached to a spring biased indicator needle, the movement of which provides an indication of the torque exerted on the reel of the device by a record/reproduce unit. Such device differs from the present invention in that it is not designed for employment in video record/reproduce units and, therefore, does not provide the capability of making the various measurements of tensions and torques that must be made to determine whether a video record/reproduce unit is operating with acceptable tensions and torques.

SUMMARY OF THE INVENTION

The present invention provides a cartridge for readily measuring transport torques and tensions of a magnetic video tape record/reproduce unit and includes a first reel rotatably mounted in the cartridge and having a cord that is wound about the reel in a direction opposite to that in which the reel is rotated by the tape unit in a rewind mode. The free end of the reel cord is positioned through one of the cartridge side walls and may be attached to a force indicating means for determining the amount of force that must be applied on such cord to overcome rewind torque of the tape unit or the brake tensions of same.

The cartridge may also include a second reel having a cord wound in a direction opposite to that in which such reel is rotated when the tape unit is in a record, reproduce or fast forward mode. The free end of the second reel cord is connected to a spring that serves as a bias means for opposing rotation of the reel. Calibration markings are carried on the second reel and are correlated to indicate the record, reproduce or fast forward torque of the tape unit.

The cartridge housing is preferably shaped similar to that of typical cartridges used in video tape units, the tensions and torques of which are to be measured. Thus, the cartridge may be loaded in the unit in identical fashion to a typical cartridge and serves to enable the tape unit in an operating mode. Thereupon, the cartridge may be employed for providing a convenient means of measuring the torques and tensions of the tape unit.

DESCRIPTION OF THE PREFERRED EMBODIMENTS

Figure 1:
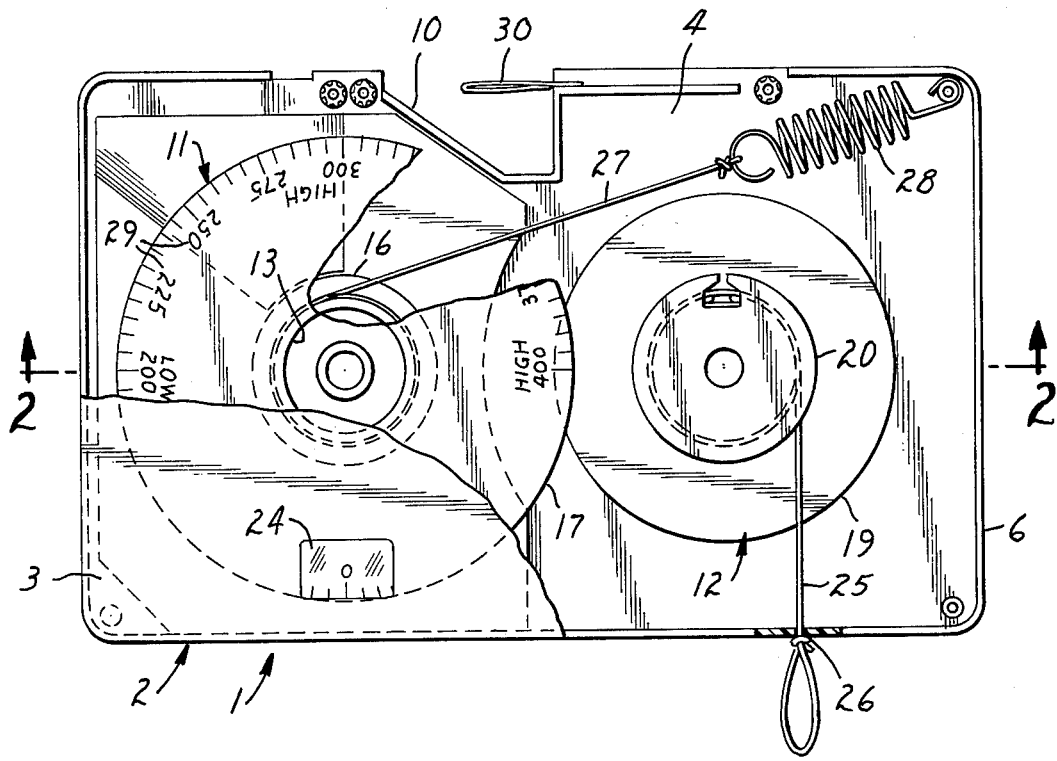
FIG. 1 is a plan view of a preferred embodiment of a measuring device of the present invention which is shown with the top wall of its housing partially cut away to expose interior components.
Figure 2:
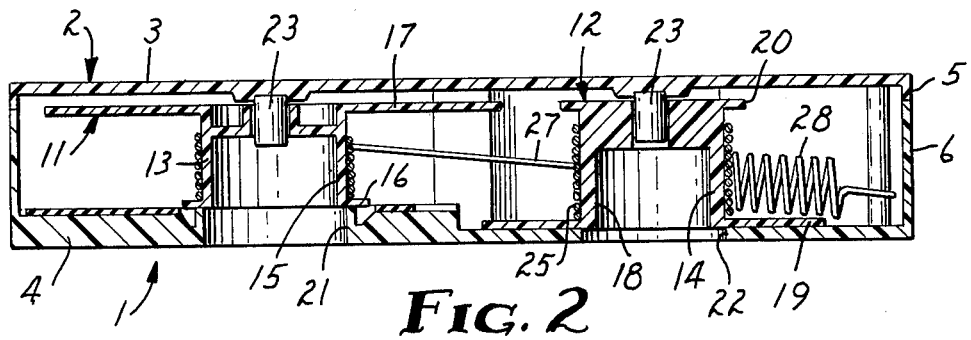
FIG. 2 is a longitudinal sectional view taken along the line 2—2 of FIG. 1.

Referring now to the drawings and with reference to both FIGS. 1 and 2, a preferred embodiment of the measuring device of the present invention is shown in the form of a cartridge 1 that is particularly adapted for measuring transport torques and tensions of typical magnetic video tape record/reproduce units.

The cartridge 1 includes a housing 2 that is basically identical to the housing of standard video tape cassette cartridges in order that it may be loaded into a record/reproduce unit to enable the operating mode of the unit so that normal transport functions such as "record," "reproduce," "fast forward," "rewind," or "stop" can be activated. The cartridge 1 includes a top cover 3 and a bottom cover 4 each having peripheral side portions 5 and 6 respectively that merge with one another to close the housing 2. The top and bottom covers 3 and 4 are substantially rectangular in shape except for a notch 10 in one side, and are preferably held together in standard fashion by screws (not shown) or ultrasonic welding.

Disposed in the interior of the housing 2 are a pair of reels 11 and 12 that respectively include hubs 13 and 14. The hub 13 has a central axial bore 15, a flange 16 of small diameter formed at its lower end and a flange 17 of large diameter formed at its upper end. The hub 14 has a central axial bore 18, a lower flange 19 of large diameter and an upper flange 20 of small diameter. The lower ends of the bores 15 and 18 generally conform in size to respective apertures 21 22 in the bottom cover 4 of the housing 2, and the upper ends of the bores 15 and 18 are necked down to closely conform to axle shafts 23 depending from the top cover of the housing 2. The shafts 23 serve to hold the reels 11 and 12 with their respective bores 15 and 18 in registration with the apertures 21 and 22 in order that when the cartridge 1 is loaded in a tape unit, drive shafts (not shown) of the tape unit will protrude into the housing 2 through the apertures 21 and 22 to drivingly engage the reels 11 and 12.

The structure of the cartridge 1 described thus far is basically the same as that of standard video cartridges of the type described in U.S. Pat. Nos. 3,797,779, 3,802,647, 3,802,648 and 3,735,939. In addition to such structure the cartridge 1 includes a window 24 in the housing top cover 3, a cord 25 that is wrapped about the reel 12 and has a looped end protruding through an opening 26 in the housing 2, and a cord 27 that is wrapped about the reel 11 and is connected at one end to a coil spring 28 fixed to one corner of the housing 2. Also, the upper surface of the reel flange 17 is calibrated with markings 29, and an opaque rectangular tab 30 is attached to the notched side of the housing 2. The opaque tab 30 cooperates in the enabling of a tape unit by serving to cover a photo transistor that normally activates the automatic stop of the unit when a tape break occurs.

The cord 25 is wrapped about the reel 12 in a direction opposite to that in which the reel 12 is driven by a tape unit in a rewind mode. In similar fashion, the cord 27 is wound on the reel 11 in a direction opposite to the direction of rotation of such reel when driven by a tape unit in a record, reproduce or fast forward mode. Thus, unwinding pressure exerted on the cords 27 and 25 opposes driving rotation of the reels 11 and 12 respectively. The cords 25 and 27 are employed to provide measurement of transport torques and tensions of a tape unit in the following manner.

Measurement of forward drive torque requires actuation of the record or reproduce mode of the unit to drive the reel 11 in a forward direction for winding the cord 27 on the hub 13 and extending the spring 28. The spring 28 thereby exerts a force on the cord 27 in opposition to forward drive of the reel 11. Extension of the spring 28 continues only so long as drive torque of the tape unit exceeds the opposing force provided by the spring 28. Once these two forces become equal, the reel 11 will cease rotating. Thus, rotation of the reel 11 directly correlates to forward drive torque. The calibration markings 29 on the flange 17 of the reel 11 are indicative of such correlation and may be seen through the window 24 to provide visual indication of the forward drive torque exerted on the reel 11. Measurement of fast forward drive torque may be made in similar fashion.

Rewind torque, fast forward hold-back tension (threading brake tension) and stop brake force all may be measured by means of the cord 25 on the reel 12 which, as previously described, is wound on the reel 12 so that unwinding force on the cord opposes rewind rotation. However, to make such measurements it is necessary to attach a force indicating means (not shown), such as a spring scale, to the looped end of the cord 25. Measuring rewind torque may be accomplished by unwinding an amount of the cord 25 from the reel 12, actuating the unit in its rewind mode, and exerting sufficient force on the cord 25 via the force indicating means to permit no rewinding or only slow rewinding of the cord 25 back on the reel 12. The magnitude of the torque exerted on the reel 12 will be evidenced by the force indicating means.

In measuring stop brake force, the tape unit is actuated in a stop mode and sufficient force is exerted on the force indicating means to slowly pull the cord 25 out of the housing. In this way, the force indicating means will indicate the force exerted on the cord 25 to overcome the stop brake. This same procedure may be followed to measure fast forward hold-back tension by actuating the tape unit in a fast forward condition.

Thus, the measuring device of the present invention provides a ready, convenient means for making torque and tension measurements of magnetic video tape record/reproduce units in relatively simplistic fashion. By the use of such device the operation of tape units may accurately be tested by unskilled personnel in order that improper tension or torque levels may be discovered before tape damage occurs.

What is claimed is:

1. A cartridge for measuring rewind torque and brake tensions of a video magnetic tape record/reproduce unit and having a housing in which at least a first reel is rotatably disposed in registration with an aperture in one of the side walls of said housing in order that when said cartridge is loaded in a video record/reproduce unit, said reel can be driven by said unit, said cartridge comprising:

a cord wrapped about said reel in a direction opposite to that in which said reel is rotated when said record/reproduce unit is actuated in a rewind mode, such cord having a free end disposed through an opening in said housing so that a determinable pressure may be exerted on said cord for opposing rewind rotation of said reel or overcoming brake force on the same.

2. A cartridge as recited in claim 1 that includes a second reel disposed in registration with another aperture in said one of the side walls of said housing so that said second reel can also be drivingly engaged by said unit, said cartridge further comprising:

calibration markings on said second reel;

a window in said housing for viewing at least one of said calibration markings;

a cord wrapped about said second reel in a direction opposite to that in which said second reel is rotated by said record/reproduce unit when actuated in a record or reproduce mode; and a bias means connected to one end of said cord wrapped about said second reel to provide a force opposing rotation of said second reel so that said reel is driven by said record/reproduce unit in a record or reproduce mode only an amount correlated to the record or reproduce torque of said unit by one of said calibrated markings viewed through said window.

3. A cartridge as recited in claim 1 that further includes an opaque tab disposed on said housing to cover a tape break photo transistor of said unit and cooperate in enabling said record/reproduce unit in an operating mode.

* * * * *